United States Patent [19]

Blad

[11] 3,962,393

[45] June 8, 1976

[54] METHOD FOR MAKING A HOLLOW LAMINATED ARTICLE

[75] Inventor: Leiv H. Blad, Van Nuys, Calif.

[73] Assignee: Lockheed Aircraft Corporation, Burbank, Calif.

[22] Filed: May 7, 1974

[21] Appl. No.: 467,762

[52] U.S. Cl. ................................ 264/90; 264/101; 264/109; 264/219; 264/309; 264/310; 264/313; 264/314; 264/318; 264/331; 264/347

[51] Int. Cl.² ...................... B29D 3/02; B29G 7/00

[58] Field of Search ............... 264/257, 258, 94, 95, 264/93, 313, 314, 88, 90–92, 96, 101, 102, 219, 225, DIG. 78, 226, 227, 88, 91, 331, 334, 337, 109, 318, 309

[56] References Cited
UNITED STATES PATENTS

| | | | |
|---|---|---|---|
| 2,838,435 | 6/1958 | Hewett | 156/285 |
| 2,923,978 | 2/1960 | Corzine | 264/90 |
| 2,962,757 | 12/1960 | Slemmons et al. | 264/93 |
| 2,967,796 | 1/1961 | Raffel | 264/314 |
| 3,013,920 | 12/1961 | Harris et al. | 264/258 |
| 3,135,640 | 6/1964 | Kepka et al. | 264/257 |
| 3,151,195 | 9/1964 | Lafferty | 264/318 |
| 3,551,237 | 12/1970 | Cox et al. | 156/173 |
| 3,617,416 | 11/1971 | Kromrey | 156/173 |
| 3,629,030 | 12/1971 | Ash | 264/314 |
| 3,654,002 | 4/1972 | Wiltshire et al. | 264/91 |

FOREIGN PATENTS OR APPLICATIONS

| | | | |
|---|---|---|---|
| 191,057 | 3/1937 | Switzerland | 264/93 |

*Primary Examiner*—Willard E. Hoag
*Attorney, Agent, or Firm*—Billy G. Corber; Lowell G. Turner

[57] ABSTRACT

A method is disclosed for fabricating in a single stage hollow polymeric article of manufacture from a flexible fibrous material, regardless of the degree of complexity of the laminate. The material is applied to a hollow flexible envelope which includes a pattern of any degree of complexity and which is supported on a solid mandrel, to be encased in a two-part female die. The envelope and applied material are sealed off from the mandrel by means of film layers forming a bag. A vacuum is established within the bag, resulting in forces acting from the inner side of the envelope through it and the laminated material against the die walls. The support mandrel is removed, and the remaining assembly is cured under the vacuum with or without elevated pressures. After cooling, the die and envelope are readily removed from the article. The apparatus comprises the envelope, the support mandrel, impermeable sealing film for bagging the laminate, the tooling such as a female die or caul plates, means for establishing a vacuum on the bagged laminate and tooling, and optionally, means for turning the envelope and mandrel as the material is applied to the envelope pattern.

11 Claims, 4 Drawing Figures

METHOD FOR MAKING A HOLLOW LAMINATED ARTICLE

BACKGROUND OF THE INVENTION

1. Field of the Invention.

The field of art to which the invention is most likely to pertain is in a class directed or generally related to the fabrication of articles of manufacture having hollow shapes and configurations and made from reinforced fibrous materials.

2. Problems in the Prior Art.

In present practices for making complex configured hollow laminates, difficulty arises in obtaining proper distribution of pressure to and across the entire (basic and built-up portions) laminate during the lay-up and curing steps of manufacture of the article. The built-up portions are required to be added in secondary stages, the basic-lay-up of laminate and the curing and pressurizing of it being considered a single stage process. Furthermore, the present-day time-consuming and expensive procedures (processes, materials andd apparatuses) do not lend themselves to an efficient and maximum use of new materials, examples of which are graphite and boron fibers.

This invention overcomes the many manufacturing problems inherent in present-day practice and techniques utilized in the manufacture of these complex configured laminates by reducing the manufacturing process to a single stage as well as providing a tooling system in which a required curing pressure can be applied to the entire laid-up laminate.

This invention also overcomes disadvantages which have become apparent in the manufacture of an excellent three-dimensional oriented space frame composite structure, named Tetra-Core, developed at the Eustis Directorate of the United States Army Air Mobility Research and Development Laboratory. For example, in this invention wall thickness is accurately controlled and the resin is restrained during the curing step, rather than being allowed to flow.

SUMMARY OF THE INVENTION

This invention relates to improvements in the manufacture of hollow articles, and embraces the development of a novel tooling system or apparatus in addition to the novel method or techniques for producing hollow articles molded from any flexible fibrous material.

An object of this invention is to adapt a novel method and tooling system or apparatus to the manufacture of a hollow article made from a flexible fibrous material.

A further object of this invention is to eliminate secondary and other stages which heretofore were required in the manufacture of reinforced fibrous hollow articles regardless of the complexity of the contoured or configured laminate constituting the form of the produced or finished article.

Another object of this invention is to produce a laminated hollow article of manufacture of any degree of contoured or configured complexity by utilizing a single stage technique of laminate lay-up and curing.

Another object of the invention is to be able to repeatedly re-use the novel tooling for making the same article of manufacture.

A further object of this invention is to provide for the utilizing of all classes of laminates; i.e., use of laminates which are cured throughout the entire range of pressures available for assisting in the molding of laminates.

Another object of this invention is to produce a lightweight, fiber reinforced hollow article having the same or superior physical and mechanical properties as that in a comparable metal article.

Another object of this invention is to utilize composite or laminate materials in hollow geodesic structures, or skeletons for helicopter main rotor blades.

A further object of this invention is to produce a rotor blade fabricated from composite or laminate materials and which offers suitable values in shear stiffness, longitudinal tensile strength and longitudinal tensile stiffness for use in a helicopter.

Another object of this invention is to increase the probability of survivability for rotor blades used in the military battlefield by means of a geodesic structure of composite or laminate materials and fabricated by the practice of this invention.

Another object of this invention is to provide support to all surfaces of the lay-up of three dimensional structure or elements, during the application of negative and positive pressures to the tooling of the invention, in order to preclude collapse or distortion of the article being produced.

Another object of this invention is to reduce time and expense in manufacturing hollow articles.

A further object of this invention is to fabricate a hollow article, regardless of the degree of its configured or contoured complexity in one stage rather than in two or more stages. For example, interior or exterior build-up and reinforcement of fabricating materials are included in the singular curing and pressurizing steps rather than being developed in additional curing and pressurizing steps.

Another object of this invention is to eliminate waste of fabricating materials which heretofore in present practice was considerable, whereas here, virtually none.

These and other objects and advantages will become more fully apparent upon a complete reading of the following description, appended claims thereto, and the accompanying drawing comprising two sheets.

DESCRIPTION OF THE PREFERRED EMBODIMENT

Figure 4:
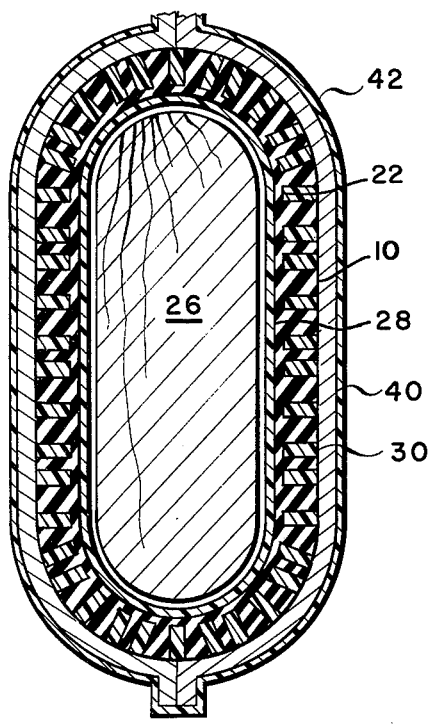
FIG. 4 is a view in cross-section of the tooling system of apparatus of the invention.

Briefly, the invention involves the construction or formation of a mold in the form of a flexible envelope for mounting on a hard support backing, and to which envelope an application of fibrous material, such as fiberglass, graphite or boron filaments and organic resin, by way of a build-up of such raw material, follows in accordance with the dimensional parameters or limitations of the end article and which are reflected in the dimensional contours or configured pattern of the envelope. The envelope itself is developed from an initially designed pattern included in a core or wooden mold. Thereafter, tooling, such as an outer female die or caul plates, is assembled to the assembly of the filament material, the envelope, and the backing, the envelope and its hard support backing sealed off from each other, a vacuum applied to a bag or chamber formed about the envelope and the tooling, after which the backing is removed, a pressure applied to the interior or inside surface(s) of the envelope, and the entire assembly then heated. After curing, the heat pressure and vacuum are released, the tooling and interior flexible envelope removed from the produced and finished article. The envelope remains suitable and immediately available for re-use.

A detailed description of an illustrative embodiment of the invention, as it pertains to the production of a rotor blade skeleton for a helicopter, follows. However, it should be understood that the invention and its practice is not limited to that particular article which includes geometric openings in addition to being hollow, but is readily adaptable to the production of countless kinds or types of hollow articles, geometrically open in its walls or solidwalled, examples of which are (but not limited thereto) aircraft fuselage and missile sections; cylindrical tubing of all kinds such as beams, masts, and driveshafts, radomes and wing sections.

Referring now to the drawing in which reference characters refer to like numerals hereinafter, the step of forming or constructing a flexible envelope 10 (FIG. 2) preferably by means of use of a basic core (pattern) 12 (FIG. 1) is first utilized. The core 12 comprises a base member 14, such as a wooden mandrel, and a plurality of individually fabricated resin or plaster casting elements 16, each of which being securely attached thereto, such as by screws 18. Although the practice of the invention is not limited thereto, in the manufacture of a rotor blade skeleton such as shown in FIG. 3, each of the elements 16 is shaped in such a manner that when the core 12 is assembled, a plurality of channels $C_1$, $C_2$, $C_3$, ..., are formed. Thus, channels $C_1$ run parallel to each other, as do the channels $C_2$, the channels $C_3$, and any additional channel pluralities which may be included. Nodes 19, i.e., the spacial intersections, are developed by the crossing of the channels $C_1$, $C_2$, $C_3$, ....

This particular core 12 is now inserted into a suitably-sized shell (not shown) whereby a spacing exists between the inner wall or walls of the shell and the most adjacent surfaces, such as 20 of the elements 16, on the core 12. Such spacing, of course, also communicates with the channels $C_1$, $C_2$, $C_3$, ..., and nodes 19 of such assembly. An intermediate mold (not shown) is cast therefrom, such as by pouring a liquid rubber (assume a green color) into such spacing. The shell is rigid, and of course includes a base and cover in order to retain the liquid rubber and for the purpose of establishing a vacuum therewithin by means of conventional vacuum and pressure lines provided in and by suitable and conventional injection equipment and facilities. An RTV (roomtemperature-vulcanization) rubber, or other known elastomeric compound, may be employed or a rubber which cures at a higher or elevated temperature is suitable for use here.

After curing of the green rubber mold, it is removed from the shell and the core pattern 12. As yet, the steps performed to this point, have not yet developed the flexible envelope 10 (FIG. 2). However, at this point, such envelope 10 can now be made directly upon the green rubber mold.

In this step for making the envelope 10, another shell (not shown) is used, this time to retain the dimensional form or contour of the green mold. A rigid mandrel (not shown) is inserted into the green cast counterpart mold. This mandrel is of less dimensions than the core 12 in order to provide a space for injection of a liquid rubber (assume its color is white) as well as providing for a skin or base 22 (FIG. 2) for the envelope 10. It should be noted that the white liquid rubber is of less durometer or hardness than its green cast counterpart, in order that the white rubber respond more readily to the action of an autoclave and because the one rubber member must be peeled from the other after curing of the white liquid rubber.

The white liquid rubber is cast or poured into such spacing, and as its nature is like that of the green rubber mold, thereafter cured in the same manner. After such curing, the rigid mandrel is removed from the assembly of white and green rubber cast members, and thereafter the one rubber member is peeled from the other. Thus, the white rubber mold constitutes the envelope 10 which is of a flexible and hollow nature, and including a predetermined pattern therein by purposeful design.

An alternative way in which to develop the flexible envelope 10 is to utilize aluminum female dies joined together, each having machined therein internally configured channels and lands which respectively correspond as counterparts to the pattern elements desirous in the envelope 10. A core mandrel is then inserted into the interior of the dies, the dies being completely closed, and the white liquid rubber injected thereinto, with curing, etc., following.

Figure 1:
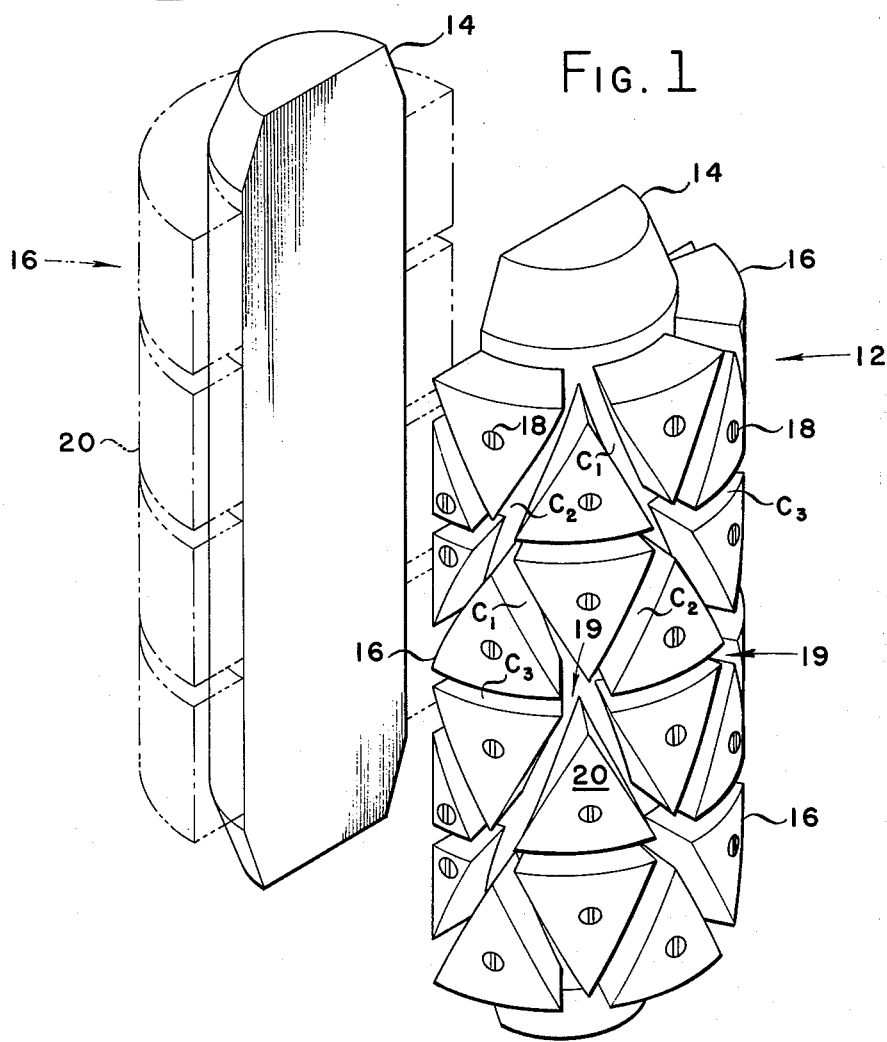
FIG. 1 is a perspective view of pattern elements utilized in the formation of a flexible envelope upon which an article of manufacture is to be produced in accordance with the teaching of this invention.
Figure 2:
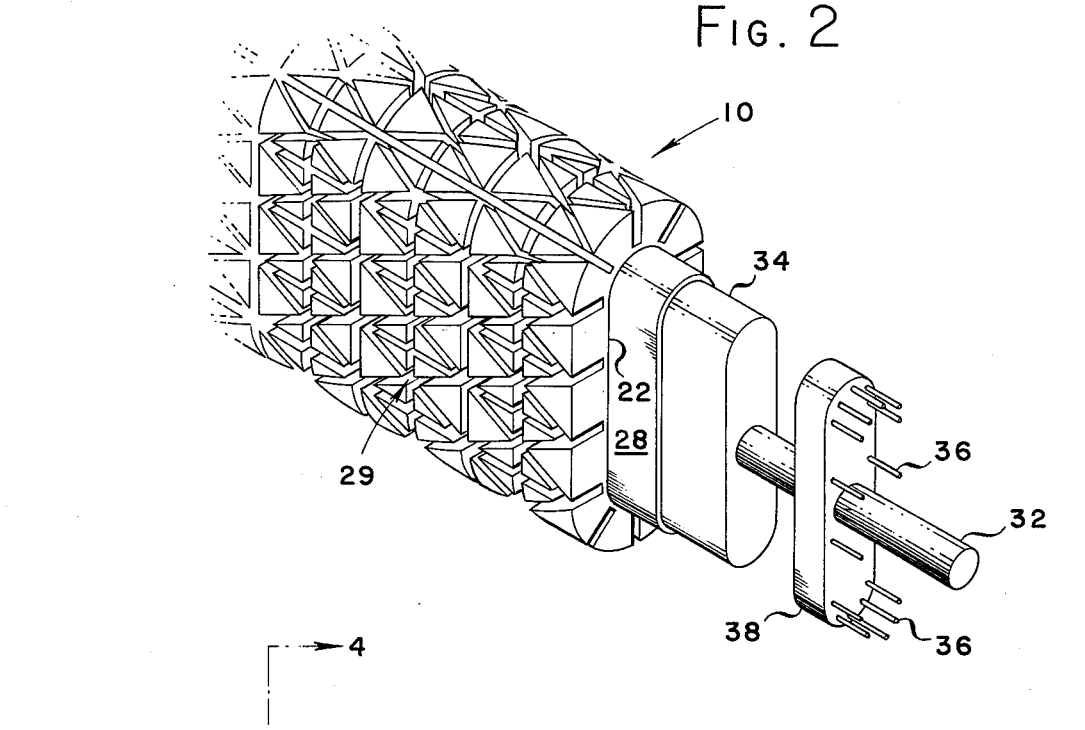
FIG. 2 is a perspective view of such a flexible envelope mounted on a support backing for the purpose of winding fibrous materials, such as organic resin filaments, thereon, to form the laminate constituting the article.
Figure 3:
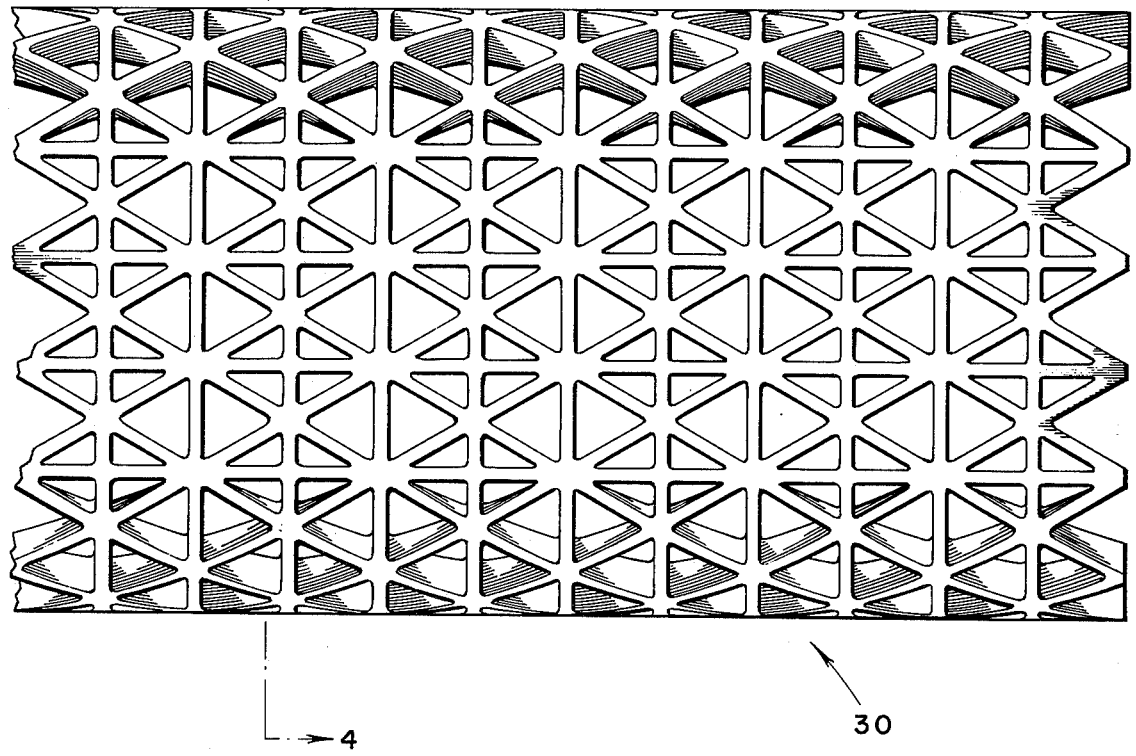
FIG. 3 is a full view of a portion of a finished article made by this invention and which in the following described illustrative embodiment is a helicopter rotor blade skeleton.

A point for purpose of clarity is in order concerning FIGS. 1 and 2. FIG. 1 illustrates a core pattern 12 merely representative as a typical embodiment of a pattern from which an envelope 10 can be produced, and is not the specific pattern 12 from which the envelope 10 shown in FIG. 2 is made. The envelope 10 illustrated in FIG. 2 would of course result from a core pattern which would manifest a substantially virtual reproduction of the features embodied in itself.

Immediately prior to mounting the hollow, flexible envelope 10 upon a mandrel 26 (FIG. 2) an impermeable film layer 28 is first mounted or wrapped about the mandrel 26 (FIG. 4), to be utilized in the sealing step described hereinafter. Preferably, two layers of film are mounted about the mandrel 26, as deterioration by handling of only one film layer has been found to occur. Nylon is a suitable material for the film used here.

With the hollow, flexible envelope 10 now available for immediate use, it is mounted upon the hard and rigid mandrel 26 shown in FIG. 4. The continuous surface of the mandrel 26 provides solid support uniformly along the entire surface or surfaces of the envelope 10 as flexible fibrous material is wound within its formed channels $c_1$, $c_2$, $c_3$, ..., and nodes 29 which are the virtual replicas of the channels $C_1$, $C_2$, $C_3$, ..., and nodes 19. The solidarity of the mandrel 26 may take the form of, but not necessarily limited to, a solid wooden or a metallic member, or even of a collapsible form such as disclosed in U.S. Letters Pat. No. 2,456,513, granted to T. L. Johnson on Dec. 14, 1958, however, suitably and conventionally modified to provide a solid wall or walls rather than merely a frame mounted on his collapsible members.

After the envelope 10 is mounted to its mandrel support backing 26, the next step is to apply the fiber material to, along, and across the channels formed in the envelope 10. In the particular embodiment illustrated, in the manufacture of a rotor blade skeleton 30 (FIG. 3) filaments are wound about the envelope in four different directions. After, say, one filament is wound once around the envelope 10 in the channel $C_1$, then the same may be done in sequence to the channels $C_2, C_3, C_4, \ldots$. Then such winding technique is repeated until the depths of all the channels in the envelope 10 have been filled with filaments. It should now become apparent that the filament windings will constitute a single integrated ribbed skeletal structure upon their curing and removal from the envelope 10. The ultimate article 30 produced is illustrated in FIG. 3, and is the result of the lay-up of these windings in the channels and nodes of the envelope having a predetermined geometrically-opened pattern.

The application of the filaments to the envelope may be accomplished in a number of ways. Hand winding or hand laying-up, sometimes referred to as a polymeric material, techniques are available, but understandably, time-consuming. A thin coat of resin can be applied to the filaments by a number of methods prior to laying up. One of the best methods is to run the filament through a resin bath just prior to laying up. The invention, at this point in its practice or procedure, also lends itself to automatic or machine winding techniques. A spraying technique in which a chopped fiber-resin mixture is sprayed into the channels of the envelope 10 is also possible.

It has been found advantageous to employ a mechanical turning of the envelope 10 and its supporting mandrel 26 while the filament or filaments are being wound thereon. This may be accomplished by providing stems 32 on end members 34 suitably mounted to the mandrel 26 (FIG. 4) and operatively connecting one or both stems 32 to a suitable power means (not shown) which provides the energy to turn the mandrel and the envelope. The mounting of pegs 36 on an arm 38 attached to each stem 32 and spaced from each end fitting 34 provides the additional advantages of maintaining a steady tension on the filaments as they are continuously wound around the envelope 10 through the aid of the pegs 36 and of making the mandrel 26 accessible for withdrawal from the envelope 10.

With the build-up of filament windings within the channels and nodes of the envelope 10 completed, this assembly is next encased within outer tooling 40 (FIG. 4) such as heatable caul plates or a female die. This tooling 40 is preferably made in at least two halves sealable in known and conventional manner to each other but having its opposite ends open in order that the mandrel 26 may, if desired, be subsequently withdrawn, as explained below. The inside dimensions of the members forming the tooling 40 are coincident with the extreme or maximum outside dimensions of the filament build-up on or within the envelope 10. A significant advantage occurs here in that a tolerance of ±0.002 inches in the flatness of an article such as in the surface of the rotor blade skeleton 30 over a 60-inch length or distance is achieved.

It may be noted here that the end fittings (for winding) and the mandrel support backing 26 may be removed after the mandrel assembly is transferred to the tooling, but before effecting a seal. The sealing step for the fibrous material or filament lay-up and envelope 10 then follows and may be accomplished in a number of ways.

In a first way, as illustrated in FIG. 4, the film layer 28 inserted between the skin 22 of the envelope 10 and its supporting mandrel 26 is attached at its exposed ends to a layer(s) of film 42 mounted or wrapped around the tooling 40 previously assembled to the envelope 10 and mandrel 26. Thus, the envelope 10 and its filament windings, but not the mandrel 26, are encased within a chamber or bag formed by the sealed film layers 28, 42.

Another way, which is to eliminate the outer film layer 42 disposed around the tooling 40, is to seal the inner film layer 28 directly to the inside surfaces of the tooling 40.

There is available in the present marketplace sealant tape comprising an uncured rubber strip of putty-like texture at room temperature but which polymerizes or vulcanizes at elevated temperatures, and which can be used for these purposes. Examples of applicable tapes are those made from zinc-chromate and butyl rubber based materials.

A vacuum is then applied to the sealed bag assembly through the use of conventional vacuum equipment and its connection by lines to the bag through one or both of the open ends of the outer tooling, die or caul plates. In this step, it should be observed that the removal of air from the bag causes the atmospheric pressure and its resultant forces to force the sealed assembly against the tooling enclosure, and thereby provide for a slight spacing to occur between the support mandrel 26 and the sealed assembly (see FIG. 4). Such spacing facilitates the removal of the mandrel prior to the curing step.

The curing step follows. For purposes of the illustrative embodiment, the entire assembly is introduced into an autoclave wherein it is heated and pressurized to, say, up to as much as 150 pounds per square inch. The pressurization provides assistance in forming the laminate winding to the desired article configuration as well as packing the laminate. Of course, some resins do not require pressurization for curing purposes, and it should be understood that depending upon the nature and purpose of the fabricated article, various resins may be utilized and which do not require elevated pressurization. Likewise, some resins cure (polymerize) at ambient temperatures and need not require an elevated temperature. Further, the rubber envelope 10 should be able to withstand curing temperatures of up to 500°F.

Finally, after curing has been accomplished, the elevated temperature and/or pressure, if any, is/are reduced. After cooling of the tooling 40, it with the envelope 10 is de-bagged and the tooling 40 opened. The (white) flexible envelope 10 is likewise removed from the interior of the finished article 30 (FIGS. 3, 4) which now stands by itself, while the envelope 10 is immediately available for re-use. So are the other elements of the tooling.

In regard to the fabrication of the skeleton 30, or to any fabrication involving wrapping filament widths in channels such as $c_1, c_2, c_3, \ldots$, in an envelope 10, the manner and pattern by which the fibers are wound on the mandrel may be critical to the integrity of the laminate. The winding pattern influences the rapid buildup in the channels or cavities. When axial elements, i.e., cavities which are parallel to the long axis of the mandrel 26, are used, the fibers must traverse long flat spans along the length of the envelope 10. The force normal to the mandrel along these spans diminishes to near zero. Therefore, the fibers in the axial member or cavities do not contribute to the laminate packing during the winding process.

The reverse is true in the radiused areas of the envelope 10 where the winding process develops a high laminate packing force. In some cases the laminate packing in the cavities or channels might be of sufficient severity in localized areas to require an additional buildup or the addition of a filler material so that the cavities are filled fully to the surface of the envelope 10 which makes direct physical contact with the tooling 40.

The buildup of the fibers throughout all the elements or cavities of the envelope 10 during the winding process only serves to compound the problem in the nodes 29, that is, the element intersections. In a final article it is desired that the thickness of its walls and its node heights be the same. Therefore, the fibers in the element cavities will have to spread as they approach the nodes. This in fact does happen to such an extent that there is a generally uniform depth to the structure being laminated. Part of the fiber spreading at the nodes 29 is accomplished during the winding process. The remainder is effected during the debulking phase (wringing out of excess resin and air in the laminates) of the cure cycle or step. The envelope design must reflect these dimensional changes to perform the spreading of the fibrous material at the nodes 29. The sum of the volumes of the elements entering each node must be therein reflected.

The epoxy-based resins used to date have been those generally used for filament winding processes. Therefore, they are not "B" staged and do not require pressure to effect a complete polymerization. This may present very real problems during the cure cycle. Pressure should not be applied so early in the cure cycle that an excess of the resin will be extruded from the laminate. However, to wait too long may cause the resin to gel prior to the application of the pressure and preclude the benefits of the process. In other words, in one case there would be a resin starved laminate, and in the other it would be porous and loosely packed. Neither is acceptable. The debulking process is inhibited, if not defeated, when the resin gels prior to the application of pressure. This will tend to complicate the removal of the support mandrel 26.

It is anticipated that the wrinkling of the fiber bundles in the nodal regions 29 and the nonuniform yarn tension caused by hand-winding operations may be responsible for discrepancies in the strength and stiffness of produced articles and the predicted results.

The tooling employed in the fabrication of composite structures, including geodesic ones, is based on the concept of producing composite tubular components by applying the laminating pressure to the inside surface of the article and reacting this pressure on the outside with a female die. This technique enables close tolerances to be held on surface contour and reduces the number of finishing operations to a single stage operation.

As opposed to a laminated composite component wherein pressure is applied to only one surface, the structure, including geodesic ones, being fabricated is three dimensional and the pressure used to debulk the elements and nodal regions must be applied to all exposed surfaces. Thus, the envelope 10 serves as a form on which to lay up the structure and support the elements during the pressure application and debulking phase to preclude collapse and distortion. Since the mandrel is pressurized during the cure cycle, it is constructed of a rubber material which would act as an incompressible fluid and thereby transmit pressure uniformly throughout the component.

Summarizing, it will be seen that the rubber envelope 10 is cast in a tubular configuration with a (geodesic) pattern inscribed on its outer surface. A rigid support 26 is used to firmly hold the rubber envelope 10 during the winding operation. Fittings with protruding pins are attached to the ends of the mandrel support to effect a change in direction of the fibers without making it necessary to wrap the fibers over the end of the envelope. The (geodesic) structure is laid up on the envelope using, preferably, either B staged polymer-preimpregnated and unidirectional tape or polymer-preimpregnated rovings of yarn. After the structure has been wound, the mandrel assembly is transferred to a set of female tools, the end fittings and mandrel support are removed, and the rubber bag is sealed to the female tools. This entire assembly is then transferred to an autoclave and cured.

The structural concept of the skeleton 30 is a spacial truss structure consisting of continuous internal members that intersect to form a waffle-like pattern. Internal members or elements of the structure are composed of unidirectional filamentary composite materials that are interleaved at the intersections or nodes, thus maintaining structural continuity. A rotor blade designed with the structural concept described above in mind can be considered as an elliptical tube with surfaces composed of longitudinal, helical, and circumferential elements. And it should be understood that the invention is not limited to such a manufacture, but only that such a manufacture was utilized to produce the invention which can be adapted to the making of innumerable laminated hollow articles as well as hollow articles having geometrical openings therein.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. The method of making a fiber-reinforced polymeric hollow article comprising:
   forming a flexible mold envelope having a pattern of channels in an external surface thereof;
   supporting said envelope on a solid mandrel disposed internally thereof;
   applying a curable resin and flexible fibrous material about said supported envelope and in the channels thereof;
   enclosing an assembly of said envelope and said mandrel with applied said resin and fibrous material within a rigid die;
   sealably enclosing said envelope and said rigid die to form a sealed enclosure;

establishing a vacuum in said sealed enclosure while admitting at least atmospheric pressure internally of said envelope in such a way as to form a separation between said envelope and said rigid die; and curing said resin.

2. The method of claim 1 wherein the flexible mold envelope comprises a hollow rubber mold.

3. The method of claim 1 wherein the flexible mold envelope comprises a collapsible mandrel.

4. The method of claim 1 wherein the first-mentioned enclosing step comprises transferring the assembly of said mandrel, envelope, and applied material together to a female die having opposing ends open.

5. The method of claim 1 including the step of heating said enclosed assembly.

6. The method of claim 1 including the steps of heating and pressurizing said sealed assembly.

7. The method of claim 1 including the step of removing the solid mandrel after the step of establishing a vacuum in the sealed enclosure and before heating and pressurizing.

8. The method of claim 1 wherein said sealing step comprises wrapping the solid mandrel with at least one impermeable film sheet and wrapping a second impermeable film sheet around the rigid die and sealing them together at their opposite ends.

9. The method of claim 1 wherein said sealing step comprises wrapping the solid mandrel with at least one impermeable film sheet and attaching said sheet to an inside surface of the rigid die after the assembly of applied material, envelope and solid mandrel.

10. The method of claim 1 wherein the flexible fibrous material utilized therein is selected from the classes of graphite, boron, rayon, cotton, and fiberglass fibers.

11. The method of claim 10 wherein the flexible fibrous material is in the form of filaments.

* * * * *